United States Patent
Banerjee et al.

(10) Patent No.: US 11,885,998 B2
(45) Date of Patent: Jan. 30, 2024

(54) METHOD OF TREATING A GLASS SURFACE AND TREATED GLASS ARTICLES

(71) Applicant: Corning Incorporated, Corning, NY (US)

(72) Inventors: Joy Banerjee, Corning, NY (US); Indrani Bhattacharyya, Hayward, CA (US); Prantik Mazumder, Ithaca, NY (US); Wanda Janina Walczak, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/759,938

(22) PCT Filed: Feb. 1, 2021

(86) PCT No.: PCT/US2021/016033
§ 371 (c)(1),
(2) Date: Aug. 2, 2022

(87) PCT Pub. No.: WO2021/158470
PCT Pub. Date: Aug. 12, 2021

(65) Prior Publication Data
US 2023/0152506 A1    May 18, 2023

Related U.S. Application Data

(60) Provisional application No. 62/971,467, filed on Feb. 7, 2020.

(51) Int. Cl.
*F21V 8/00* (2006.01)
*C03C 17/34* (2006.01)

(52) U.S. Cl.
CPC ........ *G02B 6/0043* (2013.01); *C03C 17/3405* (2013.01); *G02B 6/0061* (2013.01); *G02B 6/0065* (2013.01); *C03C 2218/32* (2013.01)

(58) Field of Classification Search
CPC ................ G02B 6/0043; G02B 6/0065; C03C 17/3405; C03C 2218/32
See application file for complete search history.

(56) References Cited

U.S. PATENT DOCUMENTS

| 4,650,889 A | 3/1987 | Plueddemann |
|---|---|---|
| 10,207,950 B2 | 2/2019 | Lee et al. |

(Continued)

FOREIGN PATENT DOCUMENTS

| CN | 102436019 A | 5/2012 |
|---|---|---|
| CN | 104718581 A | 6/2015 |

(Continued)

OTHER PUBLICATIONS

Chen et al., "Fabrication of light guide plate on PDMS-based using MEMS technique for application of LED-backlight", Key Engineering Materials 364-366, 2008, pp. 7-12.

(Continued)

*Primary Examiner* — Karabi Guharay
(74) *Attorney, Agent, or Firm* — Kevin M. Able

(57) ABSTRACT

A display backlight unit is disclosed including a glass substrate with a first major surface and a second major surface opposite the first major surface, the first major surface coated with at least one of 3-mercaptopropyl trimethoxysilane, aminopropyl triethoxysilane, or silanated PMMA, and a plurality of PMMA-containing light extraction dots deposited on the coated first major surface.

20 Claims, 3 Drawing Sheets

(56) References Cited

U.S. PATENT DOCUMENTS

| | | |
|---|---|---|
| 2005/0129882 A1 | 6/2005 | Snow |
| 2008/0089097 A1 | 4/2008 | Kim et al. |
| 2011/0143029 A1 | 6/2011 | Chen et al. |
| 2012/0287665 A1 | 11/2012 | Hyakuta et al. |
| 2014/0029295 A1 | 1/2014 | Hsiao et al. |
| 2017/0123134 A1 | 5/2017 | Moon et al. |
| 2017/0233590 A1 | 8/2017 | Karunakaran et al. |
| 2017/0233593 A1 | 8/2017 | Ogata et al. |
| 2018/0003869 A1 | 1/2018 | Yamamoto et al. |
| 2018/0265399 A1 | 9/2018 | Hwang et al. |
| 2018/0364415 A1 | 12/2018 | Shim et al. |
| 2019/0250322 A1* | 8/2019 | Hwang ................. G02B 6/005 |
| 2022/0050242 A1 | 2/2022 | Banerjee et al. |

FOREIGN PATENT DOCUMENTS

| | | |
|---|---|---|
| CN | 105700062 A | 6/2016 |
| CN | 205809342 U | 12/2016 |
| CN | 107868511 A | 4/2018 |
| CN | 108192412 A | 6/2018 |
| CN | 108359308 A | 8/2018 |
| CN | 108891022 A | 11/2018 |
| CN | 104991304 B | 2/2019 |
| EP | 1886799 A2 | 2/2008 |
| EP | 1912084 A1 | 4/2008 |
| EP | 3375762 A1 | 9/2018 |
| JP | 2013-077538 A | 4/2013 |
| JP | 6008436 B1 | 10/2016 |
| JP | 2019-502626 A | 1/2019 |
| KR | 10-2007-0018856 A | 2/2007 |
| KR | 10-0943233 B1 | 2/2010 |
| KR | 10-1230235 B1 | 2/2013 |
| WO | 2014/061612 A1 | 4/2014 |
| WO | 2014/163035 A1 | 10/2014 |
| WO | 2015/095288 A2 | 6/2015 |
| WO | 2015/153706 A1 | 10/2015 |
| WO | 2015/186753 A1 | 12/2015 |
| WO | 2018/105365 A1 | 6/2018 |
| WO | 2018/167257 A1 | 9/2018 |

OTHER PUBLICATIONS

International Search Report and Written Opinion of the International Searching Authority; PCT/US21/16033 dated Jun. 2, 2021, 12 pages; Korean Patent Office.

Lee et al., "Ceramic Ink jet Printing on Glass Substrate Using Oleophobic Surface Treatment", J. Korean Ceram. Soc., vol. 53(1), 2016, pp. 75-80.

Wang et al., "The study of light guide plate fabricated by inkjet printing technique", Journal of the Taiwan Institute of Chemical Engineers, 45(3), 2014, 3 pages.

* cited by examiner

METHOD OF TREATING A GLASS SURFACE AND TREATED GLASS ARTICLES

CROSS-REFERENCE TO RELATED APPLICATIONS

This application claims the benefit of priority under 35 U.S.C. § 371 of International Application Serial No.: PCT/US2021/016033, filed on Feb. 1, 2021, which claims the benefit of priority under 35 U.S.C. § 119 of U.S. Provisional Application Ser. No. 62/971,467 filed on Feb. 7, 2020, the contents of which are relied upon and incorporated herein by reference in their entirety.

BACKGROUND

Field

The present disclosure relates to methods of treating a glass surface and more particularly methods of forming a glass surface comprising a uniformly distributed coating offering high adhesion reliability of a pattern printed thereon.

Technical Background

Conventional components used to produce diffused light have included diffusive structures, including polymer light guides and films that have been employed in several applications in the display industry. These applications include bezel-free television systems, liquid crystal displays (LCDs), electrophoretic displays (EPD), organic light emitting diode displays (OLEDs), plasma display panels (PDPs), micro-electromechanical structures (MEMS) displays, electronic reader (e-reader) devices, and others.

Light guide plates (LGPs) are engineered components that distribute light to a display panel, and in particular LCD displays in display products such as televisions. With the natural transmission-based loss of light from the injection point via LEDs through the optical path length of the LGP, additional light extraction features can be printed on the LGP (typically polymeric ink with dispersed $SiO_2$ or $TiO_2$ particles). These additional patterned features facilitate the desired panel brightness profile via extraction of light throughout the LGPs in edge-lighted LED TV modules by breaking total internal reflection (TIR) within the LGP.

Although plastic materials can provide adequate light transmission, they exhibit relatively poor mechanical properties such as rigidity, coefficient of thermal expansion (CTE) and moisture absorption. High-transmission glasses, for example the Iris' family of glasses commercially available from Corning Incorporated, have been employed as light guide plates (LGPs), which can replace polymer LGPs and provide superior mechanical properties. Indeed, such glass substrates can provide improved rigidity, coefficient of thermal expansion and moisture absorption over poly(methyl methacrylate) ("PMMA") polystyrene ("PS") and styrene methyl methacrylate copolymer ("MS") counterparts.

Unfortunately, manufacturers' processes designed around the deposition of polymer (e.g., PMMA) light extraction features on polymer light guide plates are disadvantaged when switching to glass light guide plates, as the PMMA chemistry typically used for printing the light extraction features has insufficient adhesion to bare glass surfaces.

SUMMARY

In accordance with the present disclosure, a display backlight unit is disclosed comprising a glass substrate comprising a first major surface and a second major surface opposite the first major surface, the first major surface coated with at least one of 3-mercaptopropyl trimethoxysilane, aminopropyl triethoxysilane, or silanated PMMA, and a plurality of light extraction dots comprising PMMA deposited on the coated first major surface.

The display backlight may further comprise a light source positioned along at least one edge surface of the glass substrate.

In some embodiments, a spatial density, a diameter, or a combination thereof, of the light extraction dots can increase in a direction away from the light source.

In some embodiments, the coating can be covalently bonded to the first major surface.

In some embodiments, a thickness of the glass substrate can be in a range from about 300 micrometers to about 2.0 millimeters. A thickness of the coating can be equal to or less than about 500 nanometers, for example equal to or less than about 100 nanometers, or equal to or less than about 20 nanometers.

In accordance with various embodiments, no light extraction dot is delaminated when subjected to a Peel Test. In accordance with various embodiments, after exposure at 60° C. and 90% relative humidity for 240 hours, a color shift dy exhibited by the glass substrate is less than about 0.007 per 300 mm path length through the glass substrate and luminance changes by less than 10%.

In other embodiments, a method of making a backlight unit is described, comprising coating a first major surface of a glass substrate with at least one of 3-mercaptopropyl trimethoxysilane, aminopropyl triethoxysilane, or silanated PMMA, and depositing a plurality of PMMA-containing light extraction dots on the coated first major surface.

In some embodiments, a display device is disclosed, the display device comprising a display panel configured to display a user-viewable image, for example an LCD display panel, and a display backlight unit as described herein positioned adjacent to and behind the display panel relative to the viewer of the display device.

The method may further comprise heating the glass substrate to a temperature in a range from about 40° C. to about 65° C., for example in a range from about 45° C. to about 60° C., such as about 50° C. to about 60° C., for a time in a range from about 10 minutes to about 20 minutes after coating the first major surface but before depositing the plurality of PMMA-containing light extraction dots. In various embodiment, a thickness of the coating can be equal to or less than about 500 nanometers, for example equal to or less than about 100 nanometers, or equal to or less than about 20 nanometers The method may still further comprise heating the glass substrate to a temperature in a range from about 150° C. to about 200° C. for a time in a range from about 5 minutes to about 40 minutes after the depositing the plurality of PMMA-containing light extraction dots, for example from about 10 minutes to about 40 minutes, from about 15 minutes to about 40 minutes, from about 20 minutes to about 40 minutes, for about 30 minutes to about 40 minutes, for about 5 minutes to about 35 minutes, or from about 10 minutes to about 30 minutes.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
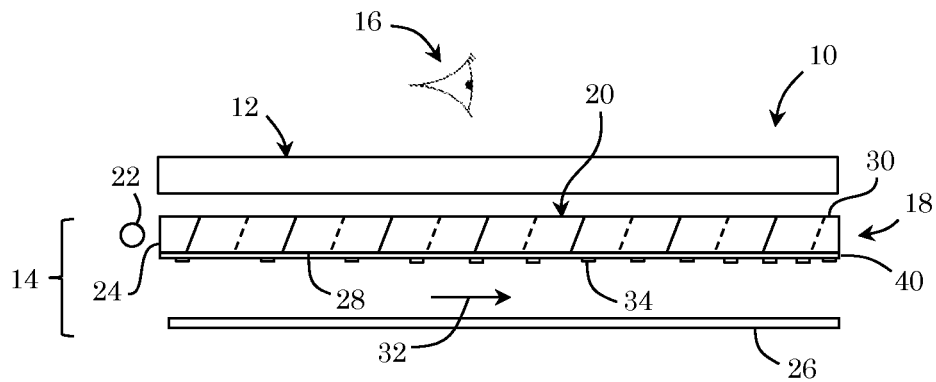
FIG. 1 is a side cross-sectional view of an exemplary LCD display in accordance with embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, another embodiment includes from the one value to the other value. Similarly, when values are expressed as approximations by use of the antecedent "about," it will be understood that the value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Shown in FIG. 1 is a cross-sectional side view of an exemplary liquid crystal display device 10 comprising a liquid crystal display (LCD) panel 12 and a backlight unit 14 positioned adjacent display panel 12 opposite a viewer 16 of LCD panel 12. Backlight unit 14 can comprise a light guide plate (LGP) 18 comprising glass substrate 20. Backlight unit 14 may further comprise a light source 22, e.g., one or more light emitting diodes, positioned proximate to and along at least one edge surface 24 of light guide plate 18 extending between major surfaces of LGP 18. In some embodiments, backlight unit 14 may further comprise a reflector 26 positioned behind LGP 18 relative to viewer 16 to redirect light emitted from a rear surface of LGP 18 in a direction back toward LGP 18 18 and LCD panel 12.

Glass substrate 20 may be any desired size and/or shape appropriate to produce a desired light distribution for LCD panel 12. Glass substrate 20 comprises a first major surface 28 and a second major surface 30 opposite first major surface 28. In some embodiments, first and second major surfaces 28, 30 are planar or substantially planar, e.g., substantially flat. First and second major surfaces 28, 30 of various embodiments may be parallel or substantially parallel. Glass substrate 20 of some embodiments includes four edge surfaces (e.g., edge surface 24) extending between first and second major surfaces 28, 30, or glass substrate 20 may comprise more than four edge surfaces, e.g. a multi-sided polygon. In other embodiments, glass substrate 20 may comprise less than four edge surfaces, e.g., a triangle. The light guide plate of various embodiments comprises a rectangular, square, or rhomboid sheet having four edge surfaces, although other shapes and configurations can be employed. Glass substrate 20 is configured and arranged to direct light from an output surface (e.g., second major surface 30) in a direction toward display panel 12.

Glass substrate 20 can comprise any material known in the art for use in display devices. In exemplary embodiments, glass substrate 20 can comprise aluminosilicate, alkali-aluminosilicate, borosilicate, alkali-borosilicate, aluminoborosilicate, alkali-aluminoborosilicate, soda-lime, or other suitable glasses. In some embodiments, the glass can be selected from an aluminosilicate glass, a borosilicate glass, or a soda-lime glass. Examples of commercially available glasses suitable for use in a glass light guide plate include, but are not limited to, Iris™ and Gorilla® glasses from Corning Incorporated.

In one or more embodiments, glass substrate 20 can comprise, in mole percent (mol %), ranges of the following oxides:
- 50-90 mol % $SiO_2$,
- 0-20 mol % $Al_2O_3$,
- 0-20 mol % $B_2O_3$, and
- 0-25 mol % $R_xO$, wherein x is 2 and R is chosen from Li, Na, K, Rb, Cs, and combinations thereof, or wherein x is 1 and R is chosen from Zn, Mg, Ca, Sr, Ba, and combinations thereof, and wherein the glass substrate comprises 0.5-20 mol % of one oxide selected from $Li_2O$, $Na_2O$, $K_2O$ and MgO. In one or more embodiments, the glass substrate comprises on a mol % oxide basis at least 3.5-20 mol %, 5-20 mol %, 10-20 mol % of one oxide selected from $Li_2O$, $Na_2O$, $K_2O$ and MgO.

In one or more embodiments, the glass substrate can comprise an aluminosilicate glass comprising at least one oxide selected from alkali oxides such as $Li_2O$, $Na_2O$, $K_2O$ and alkaline earth oxides, e.g., CaO and MgO, rendering the glass substrate susceptible to weathering products upon exposure to aging conditions described herein. In one or more embodiments, the glass substrate comprises, in mol %, ranges of the following oxides:
- $SiO_2$: from about 65 mol % to about 85 mol %;
- $Al_2O_3$: from about 0 mol % to about 13 mol %;
- $B_2O_3$: from about 0 mol % to about 12 mol %;
- $Li_2O$: from about 0 mol % to about 2 mol %;
- $Na_2O$: from about 0 mol % to about 14 mol %;
- $K_2O$: from about 0 mol % to about 12 mol %;
- ZnO: from about 0 mol % to about 4 mol %;
- MgO: from about 0 mol % to about 12 mol %;
- CaO: from about 0 mol % to about 5 mol %;
- SrO: from about 0 mol % to about 7 mol %;
- BaO: from about 0 mol % to about 5 mol %; and
- $SnO_2$: from about 0.01 mol % to about 1 mol %.

In one or more embodiments, glass substrate 20 can comprise, in mol %, ranges of the following oxides:
- $SiO_2$: from about 70 mol % to about 85 mol %;
- $Al_2O_3$: from about 0 mol % to about 5 mol %;
- $B_2O_3$: from about 0 mol % to about 5 mol %;
- $Li_2O$: from about 0 mol % to about 2 mol %;
- $Na_2O$: from about 0 mol % to about 10 mol %;
- $K_2O$: from about 0 mol % to about 12 mol %;
- ZnO: from about 0 mol % to about 4 mol %;
- MgO: from about 3 mol % to about 12 mol %;
- CaO: from about 0 mol % to about 5 mol %;
- SrO: from about 0 mol % to about 3 mol %;
- BaO: from about 0 mol % to about 3 mol %; and
- $SnO_2$: from about 0.01 mol % to about 0.5 mol %.

In one or more embodiments, glass substrate 20 can comprise, in mol %, ranges of the following oxides:
- $SiO_2$: from about 72 mol % to about 82 mol %;
- $Al_2O_3$: from about 0 mol % to about 4.8 mol %;
- $B_2O_3$: from about 0 mol % to about 2.8 mol %;
- $Li_2O$: from about 0 mol % to about 2 mol %;
- $Na_2O$: from about 0 mol % to about 9.3 mol %;
- $K_2O$: from about 0 mol % to about 10.6 mol %;
- ZnO: from about 0 mol % to about 2.9 mol %;
- MgO: from about 3.1 mol % to about 10.6 mol %;
- CaO: from about 0 mol % to about 4.8 mol %;
- SrO: from about 0 mol % to about 1.6 mol %;
- BaO: from about 0 mol % to about 3 mol %; and
- $SnO_2$: from about 0.01 mol % to about 0.15 mol %.

In one or more embodiments, glass substrate 20 can comprise, in mol %, ranges of the following oxides:
- $SiO_2$: from about 80 mol % to about 85 mol %;
- $Al_2O_3$: from about 0 mol % to about 0.5 mol %;
- $B_2O_3$: from about 0 mol % to about 0.5 mol %;
- $Li_2O$: from about 0 mol % to about 2 mol %;
- $Na_2O$: from about 0 mol % to about 0.5 mol %;
- $K_2O$: from about 8 mol % to about 11 mol %;
- ZnO: from about 0.01 mol % to about 4 mol %;
- MgO: from about 6 mol % to about 10 mol %;
- CaO: from about 0 mol % to about 4.8 mol %;
- SrO: from about 0 mol % to about 0.5 mol %;
- BaO: from about 0 mol % to about 0.5 mol %; and
- $SnO_2$: from about 0.01 mol % to about 0.11 mol %.

In one or more embodiments, glass substrate 20 can comprise, in mol %, ranges of the following oxides:
- $SiO_2$: from about 65.8 mol % to about 78.2 mol %;
- $Al_2O_3$: from about 2.9 mol % to about 12.1 mol %;
- $B_2O_3$: from about 0 mol % to about 11.2 mol %;
- $Li_2O$: from about 0 mol % to about 2 mol %;
- $Na_2O$: from about 3.5 mol % to about 13.3 mol %;
- $K_2O$: from about 0 mol % to about 4.8 mol %;
- ZnO: from about 0 mol % to about 3 mol %;
- MgO: from about 0 mol % to about 8.7 mol %;
- CaO: from about 0 mol % to about 4.2 mol %;
- SrO: from about 0 mol % to about 6.2 mol %;
- BaO: from about 0 mol % to about 4.3 mol %; and
- $SnO_2$: from about 0.07 mol % to about 0.11 mol %.

In one or more embodiments, glass substrate 20 can comprise, in mol %, ranges of the following oxides:
- $SiO_2$: from about 66 mol % to about 78 mol %;
- $Al_2O_3$: from about 4 mol % to about 11 mol %;
- $B_2O_3$: from about 40 mol % to about 11 mol %;
- $Li_2O$: from about 0 mol % to about 2 mol %;
- $Na_2O$: from about 4 mol % to about 12 mol %;
- $K_2O$: from about 0 mol % to about 2 mol %;
- ZnO: from about 0 mol % to about 2 mol %;
- MgO: from about 0 mol % to about 5 mol %;
- CaO: from about 0 mol % to about 2 mol %;
- SrO: from about 0 mol % to about 5 mol %;
- BaO: from about 0 mol % to about 2 mol %; and
- $SnO_2$: from about 0.07 mol % to about 0.11 mol %.

In one or more embodiments, glass substrate 20 can comprise the compositions provided herein and exhibit a color shift of less than 0.008 or less than 0.005 as measured by a colorimeter. In one or more embodiments, the compositions provided herein can be characterized by $R_xO/Al_2O_3$ in a range of from about 0.95 to about 3.23, where x=2 and R is any one or more of Li, Na, K, Rb, or Cs. In one or more embodiments, R can be any one of Zn, Mg, Ca, Sr or Ba, x=1 and $R_xO/Al_2O_3$ is in a range from about 0.95 to about 3.23. In one or more embodiments, R can be any one or more of Li, Na, K, Rb, or Cs, x=2 and $R_xO/Al_2O_3$ is in a range of from about 1.18 to about 5.68. In one or more embodiments, R can be any one or more of Zn, Mg, Ca, SR, or Ba, x=1 and R$_x$O/Al$_2$O$_3$ is in a range of from 1.18 to 5.68. Suitable specific compositions for glass substrates according to one or more embodiments are described in International Publication Number WO2017/070066.

In one or more embodiments, glass substrate 20 may contain some alkali constituents, e.g., the glass substrates may not be alkali-free glasses. As used herein, an "alkali-free glass" is a glass having a total alkali metal concentration less than or equal to 0.1 mole percent, where the total alkali metal concentration is the sum of the Na$_2$O, K$_2$O, and Li$_2$O concentrations. In some embodiments, the glass can comprise Li$_2$O in a range from about 0 to about 3.0 mol %, in a range from about 0 to about 2.0 mol %, or in a range from about 0 to about 1.0 mol %, and all subranges therebetween. In other embodiments, the glass may be substantially free of Li$_2$O. In other embodiments, the glass can comprise Na$_2$O in a range from about 0 mol % to about 10 mol %, in a range from about 0 mol % to about 9.28 mol %, in a range from about 0 to about 5 mol %, in a range from about 0 to about 3 mol %, or in a range from about 0 to about 0.5 mol %, and all subranges therebetween. In other embodiments, the glass may be substantially free of Na$_2$O. In some embodiments, the glass can comprise K$_2$O in a range from about 0 to about 12.0 mol %, in a range from about 8 to about 11 mol %, in a range from about 0.58 to about 10.58 mol %, and all subranges therebetween.

Glass substrate 20 in some embodiments can be a high-transmission glass, such as a high-transmission aluminosilicate glass. In certain embodiments, the light guide plate can exhibit a transmittance normal to at least one major surface greater than 90% over a wavelength range from 400 nanometers (nm) to 700 nm. For instance, the light guide plate may exhibit greater than about 91% transmittance normal to the at least one major surface, greater than about 92% transmittance normal to the at least one major surface, greater than about 93% transmittance normal to the at least one major surface, greater than about 94% transmittance normal to the at least one major surface, or greater than about 95% transmittance normal to the at least one major surface, over a wavelength range from 400 nm to 700 nm, including all ranges and subranges therebetween.

In certain embodiments, edge surface 24 of glass substrate 20 configured to receive light from light source 22 scatters light within an angle less than 12.8 degrees full width half maximum (FWHM) in transmission. In some embodiments, edge surface 24 configured to receive light from light source 22 can be processed by grinding the edge without polishing, or by other methods for processing LGPs known to those of ordinary skill in the art, for example as disclosed in U.S. Published Application No. 2015/0368146. In some embodiments, edge surface 24 can be a chamfered edge surface wherein corners of the edge surfaces are ground or otherwise removed to reduce chipping from contact with other surfaces. Alternatively, the LGP can be provided with minimal or no chamfer. For example, edge surface 24 (or any other edge surface serving as an injection site for light from a suitable light source) can be a substantially planar surface orthogonal, or substantially orthogonal, to first and second major surfaces 28, 30.

Glass substrate 20 of some embodiments can be chemically strengthened, e.g., by ion exchange. During the ion exchange process, ions within a glass article at or near the surface of the glass article can be exchanged for larger metal ions, for example, from a salt bath. The incorporation of the larger ions into the glass surface can strengthen the glass surface by creating a compressive stress in a near-surface region. A corresponding tensile stress can be induced within a central region of the glass to balance the compressive stress.

As discussed above, backlight unit 14 can comprise light source 22 positioned along at least one edge of glass substrate 20, e.g., edge surface 24 extending between first major surface 28 and second major surface 30. Light source 22 can be configured to inject light into glass substrate 20 through edge surface 24, wherein the injected light propagates through glass substrate 20 via total internal reflection (TIR) between first and second major surfaces 28 and 30.

Light injected into the LGP from light source 22 can propagate along a length L (see FIGS. 2A, 2B) of the LGP as indicated by arrow 32 due to total internal reflection (TIR) until it strikes an interface at an angle of incidence that is less than the critical angle. TIR is the phenomenon by which light propagating in a first material (e.g., glass, plastic, etc.) comprising a first refractive index can be totally reflected at the interface with a second material (e.g., air, etc.) comprising a second refractive index lower than the first refractive index. TIR can be explained using Snell's law:

$$n_1 \sin(\theta_i) = n_2 \sin(\theta_r) \tag{1}$$

which describes the refraction of light at an interface between two materials of different indices of refraction. In accordance with Snell's law, $n_1$ is the refractive index of a first material, $n_2$ is the refractive index of a second material, $\theta_i$ is the angle of the light incident at the interface relative to a normal to the interface (incident angle), and $\theta_r$ is the angle of refraction of the refracted light relative to the normal. When the angle of refraction ($\theta_r$) is 90°, e.g., $\sin(\theta_r)=1$, Snell's law can be expressed as:

$$\theta_c = \theta_i = \sin^{-1}\left(\frac{n_2}{n_1}\right) \tag{2}$$

The incident angle $\theta_i$ under these conditions may also be referred to as the critical angle $\theta_c$. Light with an incident angle greater than the critical angle ($\theta_i > \theta_c$) will be totally internally reflected within the first material, whereas light with an incident angle equal to or less than the critical angle ($\theta_i \leq \theta_c$) will be mostly transmitted by the first material.

In the case of an exemplary interface between air ($n_1=1$) and glass ($n_2=1.5$), the critical angle ($\theta_c$) can be calculated as 41°. Thus, if light propagating in the glass strikes the air-glass interface at an incident angle greater than 41°, all the incident light will be reflected from the interface at an angle equal to the incident angle. If the reflected light encounters a second interface comprising an identical refractive index relationship as the first interface, the light incident on the second interface will again be reflected at a reflection angle equal to the incident angle.

Figure 2A:
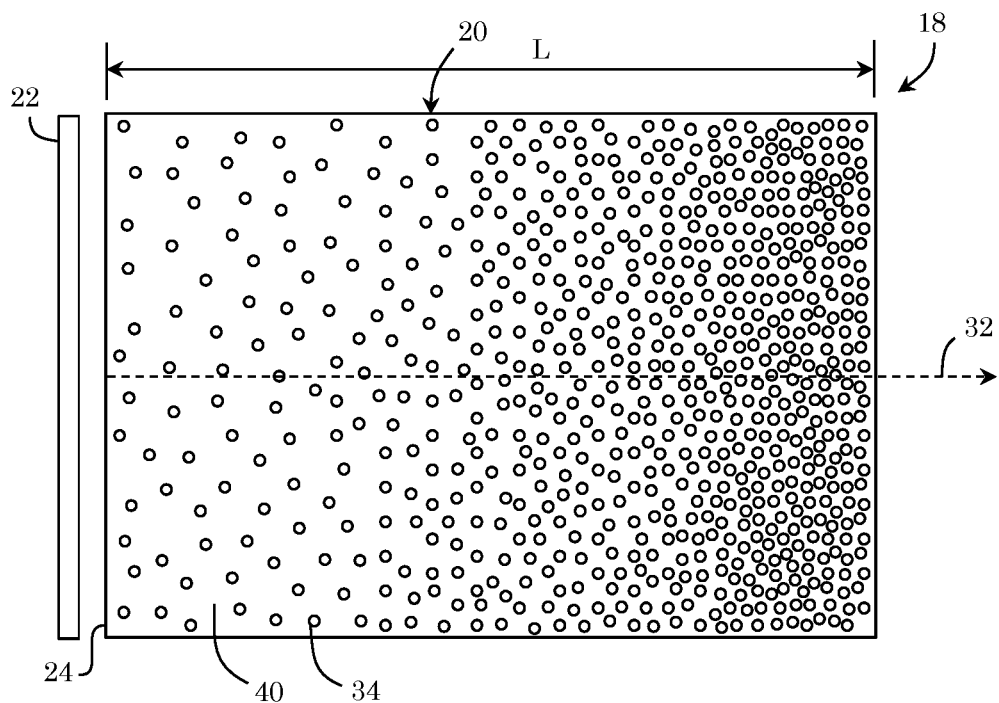
FIG. 2A is a top view of an exemplary light guide place configured for use in the display device of FIG. 1.
Figure 2B:
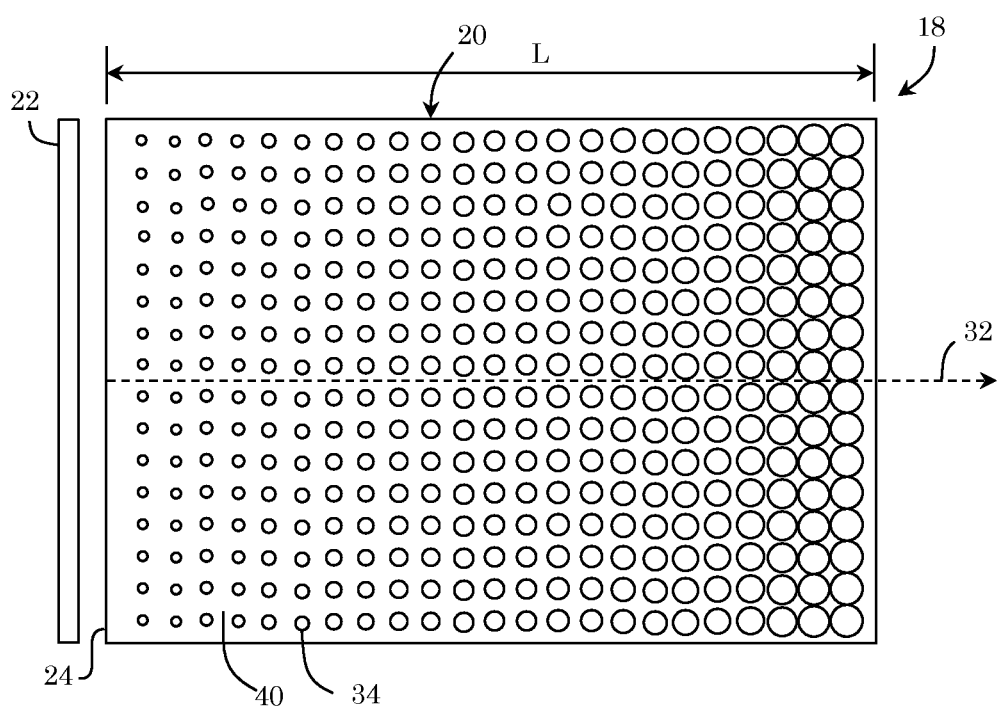
FIG. 2B is a top view of another exemplary light guide plate configured for use in the display device of FIG. 1.

To extract the light propagating in glass substrate 20, glass substrate 20 may further comprise a plurality of light extraction dots 34 deposited on first major surface 28 in a one or more of a a random pattern (FIG. 2A), a predetermined, regular (geometric, e.g., periodic) pattern (FIG. 2B), or both. For example, in some embodiments, light extraction dots 34 may be arranged such that a spatial density of the light extraction dots increases as a function of distance from light source 22 (FIG. 2A). That is, as the distance from light source 22 increases in direction 32, away from the light source, the spatial density of the light extraction dots (dots per unit area) increases. As light propagates through glass substrate 20, the light intensity decreases. Light extraction dots 34 scatter light intersecting the light extraction dots, helping direct the propagating light out of the glass substrate through second major surface 30 and toward display panel 12. As the light intensity decreases in direction 32, the increased spatial density of the light extraction dots increases light extraction, thereby compensating for the decreased light intensity. In other embodiments, a size (e.g., diameter) of the light extraction dots can increase as a function of distance from the light source, as shown in FIG. 2B. In still other embodiments, both the spatial density and the size of the light extraction dots may vary as a function of distance from the light source. For example, the size of the light extraction dots and the spatial density may increase as a function of distance from the light source. The incumbent technology for LGP 18 in display applications (e.g., computer monitors or TV) is an acrylic substrate such as poly-methylmethacrylate (PMMA). Such light guide plates can include a screen-printed light extraction pattern on at least one major surface. Printing vendors have spent decades perfecting the process of screen-printing light extraction dots on PMMA with PMMA-compatible ink. The introduction of glass light guide plates as an alternative to PMMA LGP substrates created challenges related to printing directly on bare glass.

Two components in ink for printing light extraction patterns are light-scattering particles and a binder to promote adhesion to the substrate. The binder in ink optimized for printing on PMMA substrate is typically fully-polymerized PMMA. This leads to easy dissolution and entanglement between PMMA chains of the ink with the PMMA substrate, leading to reliable adhesion of the ink to the substrate. However, such entanglement binding is not possible with a dense glass substrate, leading to poor adhesion if a PMMA-formulated ink is used directly on glass surfaces. For example, the printed light extraction patterns can easily delaminate from a glass surface during weather testing, for example during exposure at a temperature of 60° C. and 90% relative humidity (RH) for 10 days. To evaluate adhesion, a Peel Test can be performed with 3M Scotch® 600 light duty packaging tape 1 day after printing under ambient conditions. During the Peel Test a length of the tape at least 1 inch long is cut, affixed to the printed surface, and wiped for 5 seconds with a finger to remove all air bubbles underneath the tape, ensuring good adhesion between the tape and the light extraction dots. The sample is allowed to sit for 3 minutes, and then the tape is peeled off at a 90-degree angle to the printed surface. Removal, delamination, or displacement of a single light extraction dot for the purposes of this test represent a Fail designation for the tested sample.

There have been attempts at developing new inks for glass substrates with better adhesion. However, such inks have also resulted in sticking to the mesh screen of screen printers, requiring more frequent cleaning of the mesh screen than with PMMA-based inks. Therefore, although adhesion could be improved, it also led to a reduction in throughput.

Glass surfaces, due to high surface free energy and reactivity, require sophisticated handling, cleaning, and storage compared to PMMA, which affects yield and process throughput. Even after thorough washing, particles, e.g., glass particles, dust, or other foreign materials, can adhere more strongly to glass than particles on PMMA. While particles from PMMA can be easily removed by air-jet or lint-roller, more effort is needed to remove particles from glass than from PMMA. This leads to unreliable and non-uniform printed patterns on the glass and subsequently poor optical performance. Another troublesome contaminate to glass surfaces is the inadvertent contamination of the glass surfaces by hydrocarbons. Hydrocarbon contamination is particularly problematic since hydrocarbon contamination can cause a glass surface to exhibit discrete patches of highly different wetting properties. For example, a clean glass surface should have a water contact angle less than about 5 degrees, while a glass surface in contact with ambient air over time (e.g., a few days) can acquire enough organic contaminants to exhibit a contact angle of approximately 30°. If the glass surface is heavily contaminated with hydrocarbons, for example due to accidental touch or processing contamination (e.g., a PDMS lint-roller to pick up dirt), the contact angle on the contaminated region can exceed 40° and be as high as about 70°. If a light extraction dot is printed on a region of the glass surface where the perimeter of the dot encounters both low and high wetting areas a defective and non-circular geometry can result. For comparison, the water contact angle on a PMMA substrate can be about 70°. Therefore, even if a PMMA LGP is contaminated by an organic substance, the wetting property of the light guide plate does not vary as significantly as on a glass surface.

Accordingly, an LGP is disclosed that can possess advantageous properties of both glass (e.g., mechanical stiffness and thermal stability) and polymer substrates (e.g., ease of light extraction dot printing). The LGP comprises a glass substrate including a major surface coated with organic molecules such that a light extraction pattern can be printed on the glass surface with an ink optimized for PMMA while exhibiting strong adhesion between the glass and the ink even after the aforementioned weathering test. Additionally, the glass surface can resist contamination, exhibit good cleanability, and extend ageing properties that can be appealing to printers.

As used herein, the term "dry adhesion" energy refers to the work required to separate a glass substrate and a polymeric ink dot in a dry, low-humidity atmosphere. "Wet adhesion" energy refers to the work of separation when the ink-printed glass weathers in the presence of a third substance, either in a polar environment (such as weathering at 60° C. and 90% RH for 10 days) or in a non-polar environment (such as during abrasion testing by an isopropyl alcohol-soaked wipe). If the interaction energy between the polymer ink and the glass substrate is solely due to Van der Waal forces (in the absence of chemical bonding or specific interaction or physical entanglement), the expressions for dry and wet adhesion energies, $W_{dry}$ and $W_{wet}$, respectively, can be written as, $$W_{dry} = \gamma_G + \gamma_P - \gamma_{GP} \tag{1}$$

$$W_{wet} = \gamma_{GL} + \gamma_{PL} - \gamma_{GP} \tag{2}$$

Expressing the surface energy values as linear combinations of dispersion and polar components, $$W_{dry} = 2\left[\sqrt{\gamma_G^D \gamma_P^D} + \sqrt{\gamma_G^P \gamma_P^P}\right] \tag{3}$$

$$W_{wet} = 2\left[\gamma_L + \left(\sqrt{\gamma_B^D \gamma_G^D} + \sqrt{\gamma_B^P \gamma_G^P}\right) - \left(\sqrt{\gamma_B^D \gamma_L^D} + \sqrt{\gamma_B^P \gamma_L^P}\right) - \left(\sqrt{\gamma_G^D \gamma_L^D} + \sqrt{\gamma_G^P \gamma_L^P}\right)\right] \tag{4}$$

where, $\gamma_G$, $\gamma_P$, $\gamma_{GP}$, $\gamma_{GL}$, $\gamma_{PL}$ are the free surface energies of glass-air, polymer-air, glass-polymer, glass-liquid, and polymer-liquid interfaces, respectively. The superscripts D and P refer to the dispersion and polar components of the free surface energies.

As seen from these expressions, dry adhesion energy increases with increasing surface energy components of either the glass, the polymer, or both. However, wet adhesion energy values can decrease with an increasing polar energy component of the glass surface, $\gamma_G^P$, due to the large interaction energy term $\sqrt{\gamma_G^P \gamma_L^P}$, which is the attractive interaction between the glass surface and the polar liquid. For high values of $\gamma_G^P$ and $\gamma_L^P$, the $W_{wet}$ value can even become negative, suggesting spontaneous delamination of ink from the glass surface. For good adhesion reliability of a PMMA ink at the glass interface, it is desirable to have both $W_{dry}$ and $W_{wet}$ as high as possible. However, these two terms can be counteractive and cannot always be maximized independently when only Van der Waal interaction is present. In fact, surface treatments to increase $W_{dry}$ (high surface energy of glass preferred) often lead to a decrease in $W_{wet}$ and, therefore, optimization is required. On the other hand, when $W_{wet}$ is optimized for adhesion reliability in a polar environment (e.g., by reducing the polar component of surface energy), it can become inherently vulnerable to a non-polar environment (e.g., during an isopropyl alcohol resistance test). Thus, a simultaneous optimization of dry and wet adhesion energies is desired to ensure wettability by ink as well as adhesion reliability.

One approach to enhancing the reliability of the PMMA-glass interface against intrusion of a polar liquid is by hydrophobic coating of the glass surface, which only interacts with the PMMA through Van der Waal interaction. However, there are at least two problems that could arise for the current application: (1) Van der Waal interaction is too weak to survive a Peel Test with adhesive tape, and/or (2) even if the hydrophobization prevents spontaneous intrusion of water between the glass and the polymer ink, this scheme does not prevent an intrusion of non-polar liquids such as IPA, which is highly wetting to most non-fluorinated hydrophobic coatings.

To achieve adhesion strength between a polymer ink and a glass substrate that will pass a dry sample Peel Test, a Peel Test after weathering, and further pass solvent abrasion testing with IPA, a surface functionalization or coating that will promote at least one of the following features is described: (1) chemical binding between the polymer ink and the surface functionalization or coating, (2) specific interaction between the polymer ink and the surface functionalization or coating, or (3) physical interdigitation or entanglement between the polymer ink and the surface functionalization or coating Accordingly, glass substrate 20 may further comprise a coating 40 deposited on first major surface 28 between glass substrate 20 and light extraction dots 34 that aids adhesion of light extraction dots 34 to the glass substrate. That is, first major surface 28 can be coated with coating 40 and light extraction dots 34 are printed overtop coating 40. Light extraction dots 34 can be screen printed, although in further embodiments, light extraction dots 34 can be ink-jet printed. In some embodiments, coating 40 can be a silane coating, for example 3-mercaptopropyl trimethoxysilane (MPTMS) or 3-aminopropyltrimethoxysilane (APTMS).

In other embodiments, coating 40 can be a covalently-bonded polymer, such as PMMA covalently grafted on the glass surface. The covalently-bonded polymer promotes interdiffusion and/or entanglement of ink molecules with the polymeric coating. For this, coatings comprising polymers compatible with PMMA are desired. This can be achieved, for example, with a PMMA thin film deposited on the glass surface either by pre-treating the glass surface with a coupling agent, for example silane-containing compounds such as MPTMS or 3-aminopropyltrimethoxysilane (APTMS), or by using PMMA-comprising silane functional groups, such as silanated PMMA. To minimize optical distortions, coating 40 can have a thickness equal to or less than about 500 nm, for example equal to or less than about 100 nm, such as equal to or less than about 20 nm.

Coating 40 should be applied to a clean, dry surface of the glass substrate. Accordingly, the glass substrate can be cleaned with a suitable detergent and then washed, for example with deionized (DI) water, to remove detergent residue. In some embodiments, the glass substrate can be dried and/or thermally treated to remove moisture, for example by exposing the glass substrate to a dry nitrogen atmosphere. The glass substrate may be treated in a vacuum desiccator prior to or during coating of glass substrate 20 with coating 40. In some embodiments, coating 40 can be applied by wiping or painting, spraying, dipping, or spinning. In some embodiments, baking the coated substrate in an oven, for example at a temperature in a range from greater than about 100° C. to about 200° C. for a time in a range from about 30 minutes to about 24 hours, for example 200° C. for 30 minutes, may be utilized to increase adhesion of the light extraction dots.

EXAMPLES

Example 1

In one example, samples of 10.2 cm×10.2 cm (4×4 inch) Corning® Iris™ glass substrates were cleaned with a 1% Semiclean KG detergent solution for 20 minutes at 40° C., washed in deionized water, then dried with dry, ultra-pure $N_2$ gas. The glass samples were then exposed to an air plasma for 3 minutes at high power in a vacuum chamber. A thin layer, e.g., less than 10 nanometers (nm), of MPTMS was coated on clean glass surfaces of the glass samples. In one experiment, the plasma-treated glass samples were placed in a vacuum desiccator containing Indicating Drierite from W.A. Hammond Drierite Co., Lt. Several drops of MPTMS were placed in a watch-glass sitting on the floor of the desiccator. A vacuum pump was used to pull a vacuum to 0.2 Torr in the desiccator. The desiccator was then left under vacuum overnight. The next day, a set of three 10.2 centimeter (cm)×10.2 cm samples of the surface-treated glass samples were tested for surface energy measurements by measuring the water contact angle. Another set of samples was screen printed with a plurality of light extraction dots using PMMA ink (Infochem ID 8, A+B mixture), then baked at 200° C. for 30 minutes after printing.

Dry adhesion was measured on the first set of samples by the Peel Test at 6 positions per sample on a total of five samples (30 positions tested). A 5 cm length of 3M-600 tape was cut and affixed to the printed surface, wiped with a finger for 5 seconds to remove air bubbles, and after a wait of 3 minutes the tape was pulled away at a 90° angle from the glass surface. No light extraction dots were delaminated in the dry adhesion test. A second set of printed samples were kept in a weathering chamber maintained at 60° C. and 90% relative humidity (RH). After about 10 days (240 hours), another Peel Test was performed on the second set of samples to observe the effect of weathering. For glass samples treated with MPTMS, no light extraction dots peeled off after weathering, indicating optimum hydrophobization of the glass-ink interface to allow wetting of the printed ink as well as prevent penetration of water molecules.

Example 2

Figure 3:
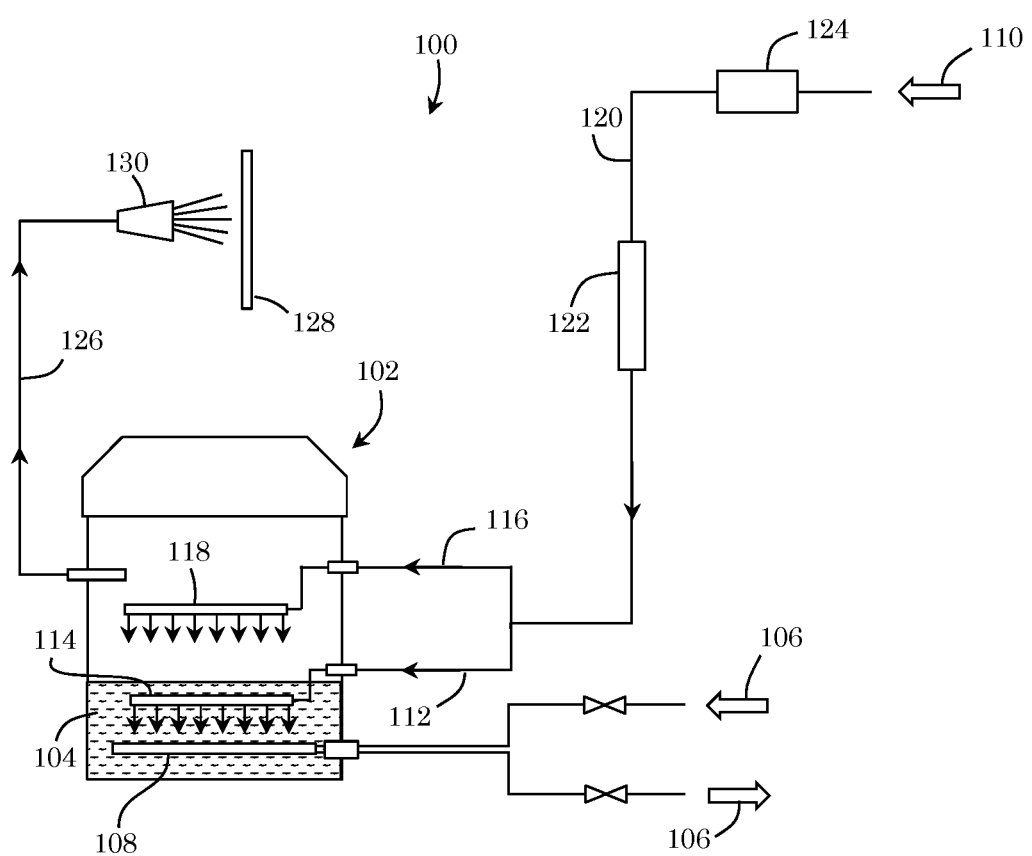
FIG. 3 is a schematic diagram of an apparatus for treating a glass substrate according to embodiments of the present disclosure.

In another experiment, 10 (ten) 370 millimeters (mm)× 470 mm samples of 1.5 mm thick Gen 2 Iris™ glass substrates were cleaned with Parker 225X detergent in a production line. The glass samples were coated with MPTMS. Referring to FIG. 3, the coating process comprised apparatus 100 including a closed, temperature-controlled stainless-steel vessel 102 filled to about 5 cm (2 inches) from the bottom of the vessel with liquid MPTMS 104. The liquid MPTMS was maintained at 50° C. for the entire duration of the coating process by circulating a temperature-controlled fluid 106 (e.g., water) through a cooling tube 108 positioned in the liquid MPTMS proximate a bottom of the vessel. Vessel 102 was fitted with two gas delivery lines in fluid communication with a source of gas (e.g., air) 110 and configured to deliver the gas to vessel 102 through a plurality of gas delivery lines. A first gas delivery line 112 delivered gas to a first distribution manifold 114 positioned in the liquid MPTMS and comprising apertures directed toward the bottom of vessel 102 such that bubbles were formed in the liquid MPTMS. A second gas delivery line 116, also in fluid communication with a source of gas (e.g., air), was arranged to deliver a carrier gas into vessel 102 through a second distribution manifold 118 positioned in an upper portion of vessel 102 above a free surface of the liquid MPTMS 104, wherein the gas flow entrained MPTMS vapor and/or aerosol droplets. The carrier gas provided through first and second gas delivery lines 112, 116 in this instance was air, but other gases, such as nitrogen are also suitable. In some embodiments, first and second gas delivery lines 112, 116 and respective gas delivery manifolds 114, 118 can be supplied from the same gas source, for example through main gas supply conduit 120. Main gas supply conduit 120 may include a heater 122 configured to heat gas 110. Additionally, a pressure of gas 110 may be regulated with a pressure regulator 124.

In this example, both of gas delivery lines 112, 116 were operated at a pressure of 0.3 MPa. A third gas delivery line 126 carried MPTMS vapor and aerosols from the upper portion of vessel 102 to a glass sample 128 positioned vertically in front of a nozzle 130 in fluid communication with the upper portion of vessel 102 through gas line 126. The glass samples were moved back and forth in front of nozzle 130 for 100 passes (e.g., about 15 minutes). One half of the glass samples were heated at an activation temperature of 50° C. for 15 minutes after the coating process. The water contact angle achieved after exposure to MPTMS for 100 passes was in a range from about 22° to about 33°, whereas the water contact angle of "activated" samples increased to a range of about 41° to about 52°. A set of 10 samples (5 activated samples and 5 non-activated samples) were screen printed with a plurality of light extraction dots using Infochem ID 8, A+B mixture PMMA ink, and then baked at 200° C. for 30 minutes.

In the following adhesion tests, a single light extraction dot delamination resulted in a Fail designation. Dry adhesion was measured on the first set of samples by the Peel Test at 6 positions per sample on a total of five samples (30 positions tested). An approximately 5 cm (2 inch) length of 3M-600 tape was cut and affixed to the printed surface, wiped with a finger for 5 seconds to remove air bubbles, and after a wait of 3 minutes the tape was pulled at a 90° angle relative to the printed surface. No light extraction dots were delaminated in the dry adhesion test for the coated samples (both heat-activated and non-activated cases) whereas significant delamination of light extraction dots was observed in the non-MPTMS-coated glass samples. The printed samples were stored in a weathering chamber maintained at 60° C. and 90% RH. After about 10 days (240 hours), another Peel Test was performed to observe the effect of weathering at 6 positions per sample on a total of 5 samples (30 positions tested). Glass samples treated with MPTMS had no light extraction dots delaminated after weathering, whereas the non-MPTMS-coated glass samples had multiple light extraction dots delaminated after weathering.

Printed samples (before weathering) were also tested for abrasion resistance with TX1039 AlphaSat cleanroom wipes (70% IPA, 30% DI water). The sample with the printed light extraction dots was abraded manually for 100 passes over an approximately 2.5-centimeter long path length with a 500-gram load placed on top of the wipe. For glass samples treated with MPTMS, no light extraction dot was peeled off after IPA abrasion, indicating optimum adhesion at the glass-ink interface that can withstand abrasion as well as prevent penetration of IPA molecules. For bare glass (non-MPTMS-coated glass samples) printed with light extraction dots, most of the dots delaminated upon IPA abrasion testing.

Example 3

In still another experiment, 100 mm×300 mm samples of Corning® Iris™ glass with a thickness of 1.1 mm were cleaned with 1% SemiClean KG detergent solution at 70° C. for 12 minutes with 37 kHz ultrasonication, followed by a DI water rinse at 70° C. for 24 minutes, a DI water rinse at 38-54 kHz ultrasonication for 7 minutes at 70° C., and exposure to 62° C. air drying for 12 minutes. The MPTMS coating process was performed in an RPX 540 (Integrated Surface Technologies) coating system with a chamber temperature of 40° C. and a pressure of about 0.1 atm. The glass samples were first exposed to an IPA and water mixture (Zorrix™, from Integrated Surface Technologies) at a pressure of about 2 atmospheres (atm) and a time of about 1 minute to prepare the surface for MPTMS exposure. Next, the glass samples were exposed to MPTMS at a pressure of about 0.25 atm and times of 1 minute, 5 minutes, 30 minutes, and 60 minutes. Eight samples were coated at each time interval. The DI water contact angle for the variety of exposure times were as follows: 1 minutes—32°, 5 minutes—37°, 30 minutes—38°, 60 minutes—46°. These samples were subsequently screen printed with a plurality of light extraction dots using InfoChem ID-8 A+B ink, and then heated at 200° C. for 30 minutes in air.

In the following adhesion tests, a single dot delamination resulted in a Fail designation. Dry adhesion was measured on the first set of samples by the Peel Test at 3 positions per sample on a total of 2 samples (6 positions tested). An approximately 5 cm (2 inch) length of 3M-600 tape was cut and affixed to the printed surface, wiped with a finger for 5 seconds to remove air bubbles, and after a 3-minute wait, pulled from the glass surface at a 90° angle relative to the sample surface. No light extraction dots were delaminated in the dry adhesion test for the 30- and 60-minute exposure times, whereas 1 of 6 positions had light extraction dot delamination after 1- and 5-minute exposure times, and the uncoated control sample had 3 of 6 positions fail. A second set of printed samples were kept in a weathering chamber maintained at 60° C. and 90% RH. After about 10 days (240 hours), another Peel Test was performed on the second set of samples to observe the effect of weathering conditions at 3 positions per sample on a total of 2 samples (6 positions tested). For glass samples treated with MPTMS for 5-, 30- and 60-minute exposures, no light extraction dots peeled off after weathering, indicating optimum hydrophobization of the glass-ink interface to allow wetting of the printed ink as well as prevent penetration of water molecules. For glass samples treated with MPTMS for a 1-minute exposure, and uncoated glass samples, multiple failure regions were detected, indicating sub-optimal hydrophobization of the glass-ink interface that allowed wetting of the printed ink but did not prevent penetration of water molecules.

Printed samples were also tested for abrasion resistance with TX1039 AlphaSat cleanroom wipes (70% IPA, 30% DI water) attached to a Taber abrader (Taber Industries, New York, USA). The samples with the printed light extraction dots were abraded 50 times with a 500-gram load applied at 40 cycles per minute and a 2.5 cm abrasion length. For glass samples treated with MPTMS for 5-, 30- and 60-minute exposures, no light extraction dots peeled off after the abrasion resistance testing, indicating optimum hydrophobization of the glass-ink interface to allow wetting of the printed ink as well as preventing penetration of IPA molecules. For glasses treated with MPTMS for a 1-minute exposure and the uncoated glasses, multiple failure regions were detected indicating sub-optimal hydrophobization of the glass-ink interface that allows wetting of the printed ink but does not prevent penetration of IPA molecules.

Color shift of MPTMS-coated glasses sized at 100 mm in width, 300 mm in length and 1.1 mm in thickness, before and after aging was tested using a Radiant Imaging PMi16 imaging colorimeter, and measurements of <0.004 before and after aging were obtained. Here, the reference for color shift differential was an uncoated, unaged, as-printed glass sample.

Example 4

In another example, an MPTMS coating was applied to glass samples via a dip-coating method. Plasma-treated glass samples were dipped in a solution of 2% MPTMS in toluene for 15 minutes. Excess solution was blown off with dry, ultra-pure $N_2$. The samples were then baked at 120° C. for 30 minutes before printing light extraction dots. Dry adhesion reliability was tested on a first set of samples by the Peel Test 1 day after printing under ambient conditions. No light extraction dots delaminated during the dry adhesion test. A second set of printed samples were kept in a weathering chamber maintained at 60° C. and 90% RH. After about 10 days (240 hours), another Peel Test was performed on the second set of samples to observe the effect of weathering. For the MPTMS-treated glass samples, no delamination of dots was observed before or after weathering.

Printed samples were also tested for abrasion resistance with isopropyl alcohol (IPA). A clean-room cloth soaked in IPA was attached to a Taber abrader. The sample with the printed dots was abraded 100 times with a 500-gram load applied and an approximately 2.5 cm abrasion length. While a sample baked at 100° C. did not pass the IPA wipe test, after baking at 200° C., no dot was delaminated.

Example 5

In another example, an APTMS coating was applied to glass samples via a dip-coating method. Plasma-treated 10 cm×10 cm Iris™ glass samples 1.5 mm thick were dipped in a solution of 2 weight percent (wt %) APTMS in water for 15 minutes. The samples were rinsed under DI water for 1 to 2 seconds, then dried with dry, ultra-pure $N_2$. The glass samples were then baked at 120° C. for 15 minutes before printing light extraction dots. The water contact angle achieved after treatment with the aqueous APTMS solution was about 20° to about 50°. A set of 10 samples was screen printed with a plurality of light extraction dots using Infochem ID 8, A+B mixture PMMA ink, then baked at 200° C. for 30 minutes.

In the following adhesion tests, a single dot delamination resulted in a Fail designation. Dry adhesion was measured on the first set of samples by the Peel Test 1 day after printing under ambient conditions at 3 positions per sample on a total of 10 samples (30 positions tested). An approximately 10 cm length (4 inches) of 3M-600 tape was cut and affixed to the printed surface, wiped with a finger for 5 seconds to remove air bubbles, and after a 3-minute wait, pulled up from the glass surface at a 90° angle. No light extraction dots were delaminated in the dry adhesion test for the APTMS-exposed samples, whereas there was significant delamination observed for bare glass samples printed with light extraction dots. A separate set of printed samples was kept in a weathering chamber maintained at 60° C. and 90% RH. After about 10 days (240 hours), another Peel Test was performed to observe the effect of weathering conditions at 3 positions per sample on a total of 10 samples (30 positions tested). For glass samples treated with APTMS, no light extraction dots delaminated after weathering, whereas non-coated glass samples had multiple light extraction dots delaminate after weathering.

Printed APTMS-exposed samples before weathering were also tested for IPA abrasion resistance with TX1039 AlphaSat cleanroom wipes. Samples with printed dots were abraded on a Taber abrader for 100 passes over an approximately 2.5 cm (1 inch) path length with a 500-gram load. For glass samples treated with APTMS, no light extraction dot was peeled off during IPA abrasion testing, indicating optimum adhesion at the glass-ink interface that can withstand abrasion as well as prevent penetration of IPA molecules. For bare glass with no APTMS coating, most of the dots delaminated upon IPA abrasion testing.

Example 6

In another experiment, Gen 2, 370 mm×470 mm Corning® Iris™ glass samples 1.5 mm thick were cleaned in a production-scale washing line. The glass samples were exposed to 0.2 wt % APTMS aqueous solution (pH in a range from about 9 to about 12) in the high-throughput production-scale washing line. After exposure to the APTMS solution, samples with and without a DI water rinse were also tested. Additionally, the effect of pre-printing thermal activation of the silane molecules on adhesion performance was investigated.

All samples were screen-printed with Infochem ID8 PMMA Ink with a Poly420 screen mask (420 mesh/inch, 27 micrometer wire diameter, open percentage 31%). After printing, the printed samples were cured at 60° C. for 30 minutes. After curing, the samples were divided into three sets: one set did not go through further heat treatment, the second set was heat treated at 200° C. for 5 minutes, and a third set was heat treated at 200° C. for 30 minutes.

In the following adhesion tests, a single dot delamination results in a Fail designation. Dry adhesion was measured on a set of samples by the Peel Test with 3M-600 light duty packaging tape 1 day after printing under ambient conditions at 3 positions per sample. An approximately 5 cm length of 3M-600 tape was cut and affixed to the printed surface, wiped with a finger for 5 seconds to remove air bubbles, and after a 3-minute wait, pulled from the glass surface at a 90° angle to the sample surface No light extraction dot was delaminated in the dry adhesion test under all conditions: i.e., DI water rinse, no DI water rinse, post-coating thermal activation and non-activation. There was significant delamination observed for bare (uncoated) glass samples. However, the reference glass, although passing dry adhesion and wet adhesion testing, failed the IPA abrasion test. A separate set of the printed samples was kept in a weathering chamber maintained at 60° C. and 90% RH. After about 10 days (240 hours), another Peel Test was performed to observe the effect of weathering conditions at 3 positions per sample. For glass samples treated with APTMS (no DI water rinse, with or without 200° C. heat treatment), no light extraction dots delaminated after weathering.

Printed samples before weathering were also tested for IPA abrasion resistance with TX1039 AlphaSat cleanroom wipes. The samples with the printed light extraction dots were abraded on a Taber abrader for 100 passes over an approximately 2.5 cm long path length with a 500-gram load. For glass samples treated with APTMS, no light extraction dot was peeled off after IPA abrasion testing, indicating optimum adhesion at the glass-ink interface that can withstand abrasion as well as prevent penetration of IPA molecules. For light extraction dots printed on bare glass (without surface treatment), most of the dots delaminated during IPA abrasion testing.

Optical properties of the printed samples were measured before heat treatment at 200° C., after heat treatment (at 200° C. for 5 minutes or at 200 C.° for 30 minutes), and after weathering. Luminance of APTMS-treated samples (both with and without a DI water rinse) was tested with a Topcon SR-series Spectroradiometer (Topcon Technohouse Corporation, Itabashi-ku, Tokyo) and found to be in a range of about 14,700 nits to about 15,100 nits, whereas a bare glass sample had a luminance of 14,921 nits. These values are well within the measurement error. Before the 200° C. post-printing heat treatment step, color shift (CS) values were also measured using the same instrument and found to be in a range from about 0.009 to about 0.010 for all samples.

After the 200° C. heat treatment, the bare (uncoated but printed) glass had a luminance change of about −1.6%, whereas, on average, the luminance change for APTMS-treated samples was about −2.3%, which is still within an acceptable range for luminance performance. For color shift, the bare glass showed an increase in a range from about 0.009 to about 0.011, whereas for APTMS-treated samples the color shift increased to a range from about 0.010 to about 0.012, again an acceptable range.

Example 7

In still another example, silanated PMMA was used for surface treatment. A clean-room cloth was soaked in a silanated PMMA solution and wiped on plasma-treated glass samples to create a uniform coating. The samples were left to dry under a hood in ambient conditions for 20 minutes. The samples were baked at 100° C. for 30 minutes after printing with light extraction dots. Dry adhesion was tested by the Peel Test with 3M-600 tape one day after printing under ambient conditions (room temp and about 40% relative humidity). No light extraction dots were delaminated during dry adhesion testing. A second set of screen-printed glass samples was kept in a weathering chamber maintained at 60° C. and 90% RH. After about 10 days (240 hours), a Peel Test was performed on the second set of glass samples to observe the effect of weathering. For silanated PMMA-treated glass samples, no light extraction dots peeled off after weathering, indicating hydrophobization of the glass-ink interface to allow wetting of the printed ink as well as prevent penetration of water molecules. It is theorized the surface coating also allowed penetration of ink molecules into the PMMA network of the surface coating and thereby provided an additional increase in both dry and wet adhesion energies.

Printed glass samples were also tested for abrasion resistance. A clean-room cloth soaked in isopropyl alcohol was attached to a Tabor abrader with a 500-gram load. Glass samples with printed light extraction dots were abraded 100 times with an approximately 2.5 cm abrasion length. While a glass sample heat treated at 100° C. after printing did not pass the IPA abrasion test, after heat treating a second glass sample at 200° C., no dot was delaminated on the second sample.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A display backlight unit, comprising:
   a glass substrate comprising a first major surface and a second major surface opposite the first major surface, the first major surface directly coated with at least one of 3-mercaptopropyl trimethoxysilane, aminopropyl triethoxysilane, or silanated PMMA, and a plurality of light extraction dots comprising PMMA deposited on the coated first major surface.

2. The display backlight unit of claim 1, further comprising a light source positioned along at least one edge surface of the glass substrate.

3. The display backlight unit of claim 2, wherein a spatial density, a diameter, or a combination thereof, of the light extraction dots increases in a direction away from the light source.

4. The display backlight unit of claim 1, wherein the coating is covalently bonded to the first major surface.

5. The display backlight unit of claim 1, wherein a thickness of the glass substrate is in a range from about 300 micrometers to about 2.0 millimeters.

6. The display backlight unit of claim 1 wherein a thickness of the coating is equal to or less than about 500 nanometers.

7. The display backlight unit of claim 6, wherein the thickness of the coating is equal to or less than about 100 nanometers.

8. The display backlight unit of claim 7, wherein the thickness of the coating is equal to or less than about 20 nanometers.

9. The display backlight unit of claim 1, wherein after exposure at 60° C. and 90% relative humidity for 240 hours, a color shift dy exhibited by the glass substrate is less than about 0.007 per 300 mm path length through the glass substrate and luminance changes by less than 10%.

10. A display device comprising the display backlight unit of claim 1, the display device comprising a display panel positioned adjacent to the display backlight unit.

11. The display backlight unit of claim 1, wherein the coating of the at least one of 3-mercaptopropyl trimethoxysilane, aminopropyl triethoxysilane, or silanated PMMA on the first major surface of the glass substrate is not removable from the glass substrate after curing.

12. A method of making a backlight unit, comprising:
directly coating a first major surface of a glass substrate with at least one of 3-mercaptopropyl trimethoxysilane, aminopropyl triethoxysilane, or silanated PMMA;
depositing a plurality of PMMA-containing light extraction dots on the coated first major surface.

13. The method of claim 12, further comprising heating the glass substrate to a temperature in a range from about 40° C. to about 65° C. for a time in a range from about 10 minutes to about 20 minutes after coating the first major surface but before depositing the plurality of PMMA-containing light extraction dots.

14. The method of claim 13, further comprising heating the glass substrate to a temperature in a range from about 150° C. to about 200° C. for a time in a range from about 5 minutes to about 40 minutes after the depositing the plurality of PMMA-containing light extraction dots.

15. The method of claim 13, wherein the coating of the at least one of 3-mercaptopropyl trimethoxysilane, aminopropyl triethoxysilane, or silanated PMMA to the first major surface of the glass substrate is not removable from the glass substrate after curing.

16. A display backlight unit, comprising:
a glass substrate comprising a first major surface and a second major surface opposite the first major surface, the first major surface coated with at least one of 3-mercaptopropyl trimethoxysilane, aminopropyl triethoxysilane, or silanated PMMA, and a plurality of light extraction dots comprising PMMA deposited on the coated first major surface,
wherein after exposure at 60° C. and 90% relative humidity for 240 hours, a color shift dy exhibited by the glass substrate is less than about 0.007 per 300 mm path length through the glass substrate and luminance changes by less than 10%.

17. The display backlight unit of claim 16, further comprising a light source positioned along at least one edge surface of the glass substrate.

18. The display backlight unit of claim 17, wherein a spatial density, a diameter, or a combination thereof, of the light extraction dots increases in a direction away from the light source.

19. The display backlight unit of claim 16, wherein a thickness of the glass substrate is in a range from about 300 micrometers to about 2.0 millimeters.

20. The display backlight unit of claim 16, wherein a thickness of the coating is equal to or less than about 500 nanometers.

* * * * *

UNITED STATES PATENT AND TRADEMARK OFFICE
CERTIFICATE OF CORRECTION

| | |
|---|---|
| PATENT NO. | : 11,885,998 B2 |
| APPLICATION NO. | : 17/759938 |
| DATED | : January 30, 2024 |
| INVENTOR(S) | : Joy Banerjee et al. |

It is certified that error appears in the above-identified patent and that said Letters Patent is hereby corrected as shown below:

In the Claims

In Column 18, Line 51, in Claim 6, delete "1" and insert -- 1, --.

Signed and Sealed this
Fourth Day of June, 2024

Katherine Kelly Vidal
*Director of the United States Patent and Trademark Office*